US012661989B2

(12) United States Patent
Tsujino et al.

(10) Patent No.: US 12,661,989 B2
(45) Date of Patent: Jun. 23, 2026

(54) VEHICLE DISPLAY CONTROL DEVICE, VEHICLE DISPLAY CONTROL METHOD, AND NON-TRANSITORY STORAGE MEDIUM

(71) Applicant: TOYOTA JIDOSHA KABUSHIKI KAISHA, Toyota (JP)

(72) Inventors: Miki Tsujino, Nagakute (JP); Kentaro Matsumoto, Toyota (JP); Ryusei Gichu, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 18/415,342

(22) Filed: Jan. 17, 2024

(65) Prior Publication Data
US 2024/0262203 A1 Aug. 8, 2024

(30) Foreign Application Priority Data

Feb. 8, 2023 (JP) ................................. 2023-017946

(51) Int. Cl.
| | |
|---|---|
| *B60K 35/81* | (2024.01) |
| *B60K 35/29* | (2024.01) |
| *B60K 35/60* | (2024.01) |
| *B60W 30/12* | (2020.01) |
| *B60W 30/14* | (2006.01) |

(Continued)

(52) U.S. Cl.
CPC .............. *B60K 35/81* (2024.01); *B60K 35/29* (2024.01); *B60K 35/60* (2024.01); *B60W 30/12* (2013.01); *B60W 30/14* (2013.01); *B60W 50/14* (2013.01); *B60W 60/0027*

(2020.02); *B60K 2360/166* (2024.01); *B60K 2360/172* (2024.01); *B60K 2360/175* (2024.01); *B60K 2360/186* (2024.01); *B60K 2360/188* (2024.01); *B60W 2050/146* (2013.01); *B60W 2420/403* (2013.01); *B60W 2540/223* (2020.02); *B60W 2552/53* (2020.02)

(58) Field of Classification Search
CPC ........ B60K 35/81; B60K 35/29; B60K 35/60; B60K 2360/166; B60K 2360/172; B60K 2360/188; B60K 2360/186; B60K 2360/175; B60W 60/0027; B60W 30/12; B60W 30/14; B60W 50/14; B60W 2552/53; B60W 2540/223; B60W 2050/146; B60W 2420/403
See application file for complete search history.

(56) References Cited

U.S. PATENT DOCUMENTS

| | | | | |
|---|---|---|---|---|
| 2018/0345964 A1* | 12/2018 | Fujii | .................... | B62D 15/025 |
| 2019/0071099 A1* | 3/2019 | Nishiguchi | .......... | B60W 50/12 |
| 2019/0275935 A1* | 9/2019 | Lisseman | ................. | B62D 1/06 |

(Continued)

FOREIGN PATENT DOCUMENTS

| | | |
|---|---|---|
| JP | 2020-073374 A | 5/2020 |
| JP | 2022-031101 A | 2/2022 |
| WO | 2018/220828 A1 | 12/2018 |

*Primary Examiner* — Naeem Taslim Alam
(74) *Attorney, Agent, or Firm* — Oliff PLC

(57) ABSTRACT

A vehicle display control device includes a display control unit configured to display a main image and an auxiliary image in a display portion mounted on a vehicle such that the main image is provided with a display taste that is common to a hands on mode and a hands off mode and a display mode of the auxiliary image is changed between the hands on mode and the hands off mode.

14 Claims, 9 Drawing Sheets

(51)  Int. Cl.
   *B60W 50/14*          (2020.01)
   *B60W 60/00*          (2020.01)

(56)                    References Cited

U.S. PATENT DOCUMENTS

| 2020/0172122 | A1* | 6/2020 | Mimura | .......... | B60W 60/0051 |
| 2020/0172123 | A1* | 6/2020 | Kubota | .......... | B60W 60/0053 |
| 2021/0146962 | A1* | 5/2021 | Kaji | .......... | B60W 30/17 |
| 2022/0203989 | A1* | 6/2022 | Hosoya | .......... | B60W 60/0055 |
| 2023/0182764 | A1 | 6/2023 | Fukui et al. | | |
| 2024/0217536 | A1* | 7/2024 | Hu | .......... | B60W 50/14 |
| 2025/0196644 | A1* | 6/2025 | Takano | .......... | B60K 37/00 |

\* cited by examiner

FIG. 8

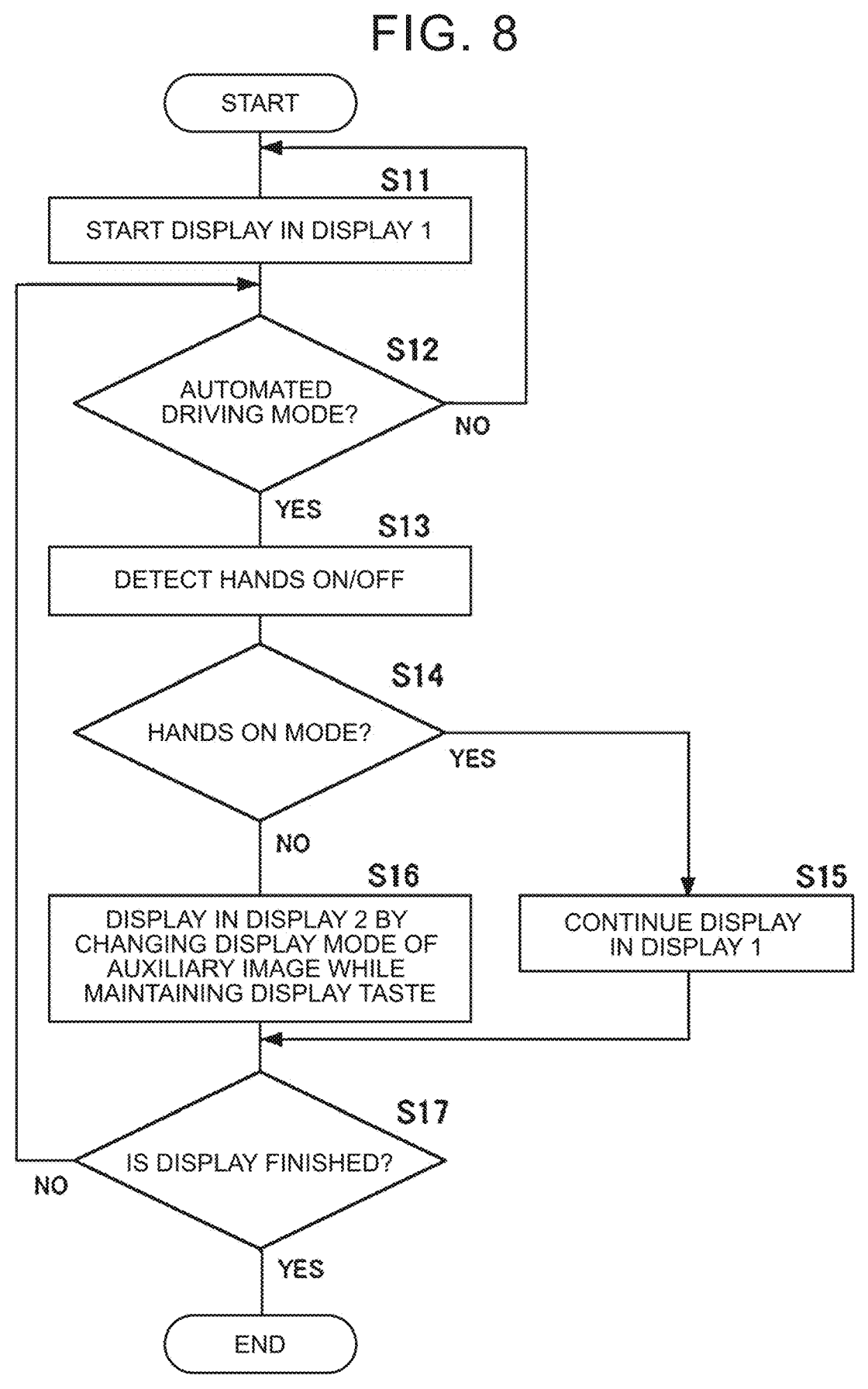

START

S11
START DISPLAY IN DISPLAY 1

S12
AUTOMATED DRIVING MODE? — NO

YES

S13
DETECT HANDS ON/OFF

S14
HANDS ON MODE? — YES

NO

S16
DISPLAY IN DISPLAY 2 BY CHANGING DISPLAY MODE OF AUXILIARY IMAGE WHILE MAINTAINING DISPLAY TASTE

S15
CONTINUE DISPLAY IN DISPLAY 1

S17
IS DISPLAY FINISHED?

NO

YES

END

VEHICLE DISPLAY CONTROL DEVICE, VEHICLE DISPLAY CONTROL METHOD, AND NON-TRANSITORY STORAGE MEDIUM

CROSS-REFERENCE TO RELATED APPLICATION

This application claims priority to Japanese Patent Application No. 2023-017946 filed on Feb. 8, 2023, incorporated herein by reference in its entirety.

BACKGROUND

1. Technical Field

The present disclosure relates to a vehicle display control device, a vehicle display control method, and a non-transitory storage medium.

2. Description of Related Art

Japanese Unexamined Patent Application Publication No. 2020-073374 (JP 2020-073374 A) discloses meter graphics for different degrees of driving assist. In the meter graphics described in JP 2020-073374 A, the display mode is changed in accordance with the degree of contribution of an automated driving function.

SUMMARY

Since the layout and design of the entire meter are changed in the technique described in JP 2020-073374 A, however, there are so many changes on the display screen that occupants may feel annoyed. In addition, there may be little connection between modes of the automated driving function.

The present disclosure provides a vehicle display control device, a vehicle display control method, and a non-transitory storage medium that allow an occupant to recognize whether a vehicle is in a hands on mode or a hands off mode and keep the connection in the display taste between the hands on mode and the hands off mode while suppressing the occupant feeling annoyed when mode switching is made between the hands on mode and the hands off mode.

A first aspect of the present disclosure provides a vehicle display control device. The vehicle display control device includes a display control unit configured to display a main image and an auxiliary image in a display portion mounted on a vehicle such that the main image is provided with a display taste that is common to a hands on mode and a hands off mode and a display mode of the auxiliary image is changed between the hands on mode and the hands off mode. The hands on mode is a mode in which a steering wheel of the vehicle needs to be grasped. The hands off mode is a mode in which the steering wheel does not need to be grasped. In the present disclosure, the "display taste" may be used to intend the direction of display design including the atmosphere corresponding to the purpose such as sports mode, eco mode, and drive mode, for example.

In the vehicle display control device according to the first aspect of the present disclosure, the amount of change on the display screen in the main image can be suppressed, since the main image is provided with a display taste that is common to the hands on mode and the hands off mode. Therefore, it is possible to suppress an occupant feeling annoyed when mode switching is made between the hands on mode and the hands off mode. In addition, it is possible to keep the connection in the display taste between the hands on mode and the hands off mode, since the main image is provided with a display taste that is common to the hands on mode and the hands off mode. In addition, the occupant is allowed to recognize the hands on mode and the hands off mode, since the display mode of the auxiliary image is changed between the hands on mode and the hands off mode.

In the vehicle display control device according to the first aspect of the present disclosure, the hands on mode may include a manual driving mode and an automated driving mode. The display control unit may be configured to provide the main image with the display taste that is common to the manual driving mode in the hands on mode and the automated driving mode in the hands on mode. The display control unit may be configured to display the main image in the display portion in the manual driving mode and the automated driving mode.

In the vehicle display control device according to the first aspect of the present disclosure, the amount of change on the display screen in main image can be suppressed in the hands on mode, since the main image is provided with a display taste that is common to the manual driving mode and the automated driving mode. Therefore, it is possible to suppress the occupant feeling annoyed when mode switching is made between the manual driving mode and the automated driving mode. In addition, it is possible to keep the connection in the display taste between the manual driving mode and the automated driving mode, since the main image is provided with a display taste that is common to the manual driving mode and the automated driving mode.

In the vehicle display control device according to the first aspect of the present disclosure, the hands on mode may include a driving assist mode and an automated driving mode.

In the vehicle display control device according to the first aspect of the present disclosure, it is possible to suppress the amount of change in the display mode of the entire main image and the auxiliary image between the driving assist mode and the automated driving mode. Therefore, it is possible to suppress the occupant feeling annoyed when mode switching is made between the driving assist mode and the automated driving mode in the hands on mode.

In the vehicle display control device according to the first aspect of the present disclosure, the driving assist mode may include auto cruise control and lane tracing assist.

In the vehicle display control device according to the first aspect of the present disclosure, it is possible to suppress the amount of change in the display mode of the main image and the auxiliary image between the auto cruise control and the lane tracing assist and the automated driving mode. Therefore, it is possible to suppress the occupant feeling annoyed when switching is made between the auto cruise control and the lane tracing assist and the automated driving mode.

In the vehicle display control device according to the first aspect of the present disclosure, the main image may include a vehicle image as an image of a host vehicle, a vehicle image as an image of a different vehicle, and a lane image.

In the vehicle display control device according to the first aspect of the present disclosure, the display taste is not changed for the host vehicle, the different vehicle, or the lane, and thus the occupant can visually recognize the positional relationship of the host vehicle, the different vehicle, and the lane without feeling annoyed by a change in the display taste.

In the vehicle display control device according to the first aspect of the present disclosure, the auxiliary image may be an image that indicates a host vehicle peripheral region. The display control unit may be configured to change a tint in a region of the auxiliary image. The display control unit may be configured to display the auxiliary image in the display portion.

In the vehicle display control device according to the first aspect of the present disclosure, the occupant can recognize mode switching between the hands on mode and the hands off mode in accordance with a change in the tint in the region of the auxiliary image, even if the tint of the main image is not changed.

In the vehicle display control device according to the first aspect of the present disclosure, the auxiliary image may be an image that indicates a trajectory line of a preceding vehicle.

In the vehicle display control device according to the first aspect of the present disclosure, the occupant can recognize mode switching between the hands on mode and the hands off mode when the display mode of an image that indicates the trajectory line of the preceding vehicle is changed.

A second aspect of the present disclosure provides a vehicle display control method. The vehicle display control method includes displaying a main image and an auxiliary image in a display portion mounted on a vehicle such that the main image is provided with a display taste that is common to a hands on mode and a hands off mode and a display mode of the auxiliary image is changed between the hands on mode and the hands off mode. The hands on mode is a mode in which a steering wheel of the vehicle needs to be grasped. The hands off mode is a mode in which the steering wheel does not need to be grasped.

In the vehicle display control method according to the second aspect of the present disclosure, the main image is provided with a display taste that is common to the hands on mode and the hands off mode, and thus the amount of change on the display screen in the main image can be suppressed. Therefore, it is possible to suppress an occupant feeling annoyed when mode switching is made between the hands on mode and the hands off mode. In addition, it is possible to keep the connection in the display taste between the hands on mode and the hands off mode, since the main image is provided with a display taste that is common to the hands on mode and the hands off mode. In addition, the occupant is allowed to recognize the hands on mode and the hands off mode, since the display mode of the auxiliary image is changed between the hands on mode and the hands off mode.

A third aspect of the present disclosure provides a non-transitory storage medium storing instructions that are executable by one or more processors and that cause the one or more processors to execute a function. The function includes displaying a main image and an auxiliary image in a display portion mounted on a vehicle such that the main image is provided with a display taste that is common to a hands on mode and a hands off mode and a display mode of the auxiliary image is changed between the hands on mode and the hands off mode. The hands on mode is a mode in which a steering wheel of the vehicle needs to be grasped. The hands off mode is a mode in which the steering wheel does not need to be grasped.

In the third aspect of the present disclosure, the entire main image is provided with a display taste that is common to the hands on mode and the hands off mode, and thus the amount of change on the display screen in the main image can be suppressed. Therefore, it is possible to suppress an occupant feeling annoyed when mode switching is made between the hands on mode and the hands off mode. In addition, it is possible to keep the connection in the display taste between the hands on mode and the hands off mode, since the main image is provided with a display taste that is common to the hands on mode and the hands off mode. In addition, the occupant is allowed to recognize the hands on mode and the hands off mode, since the display mode of the auxiliary image is changed between the hands on mode and the hands off mode.

As has been described above, the vehicle display control device, the vehicle display control method, and the non-transitory storage medium according to the aspect of the present disclosure have an excellent effect of allowing an occupant to recognize whether a vehicle is in a hands on mode or a hands off mode and keep the connection in the display taste between the hands on mode and the hands off mode while suppressing the occupant feeling annoyed when mode switching is made between the hands on mode and the hands off mode.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart illustrating an example of the flow of a display control process according to the embodiment.

DETAILED DESCRIPTION OF EMBODIMENTS

Figure 1:
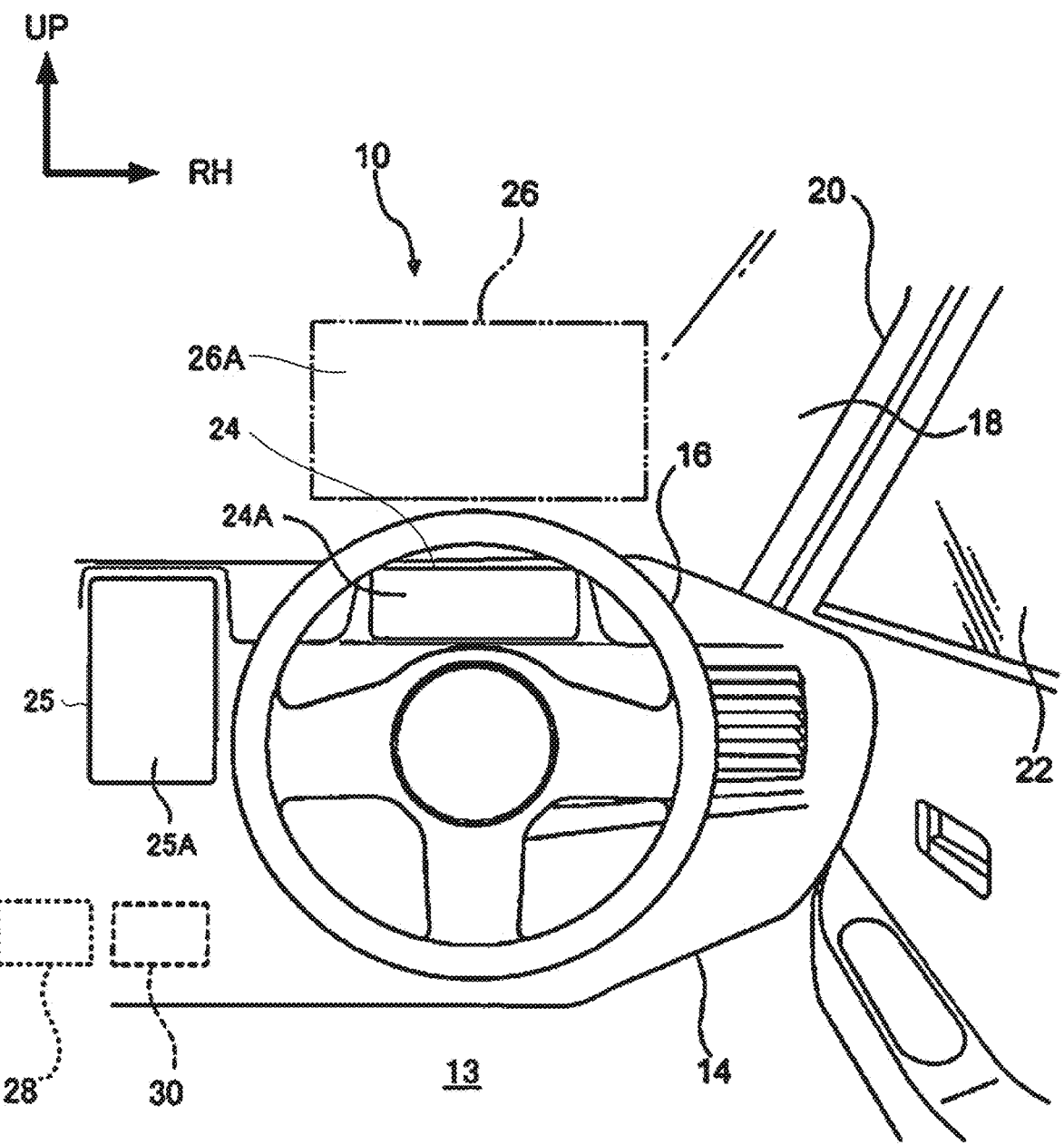
FIG. 1 is a schematic view of a front portion of a vehicle cabin of a vehicle to which a vehicle display device according to an embodiment is applied, as seen from the vehicle rear side.

A vehicle 10 as a host vehicle to which a display control electronic control unit (ECU) 30, a drive assist ECU 28, etc. as a vehicle display control device according to an embodiment of the present disclosure are applied will be described with reference to the drawings. In FIG. 1, an arrow UP indicates the upper side in the vehicle up-down direction, and an arrow RH indicates the right side in the vehicle width direction. In the following description, the up-down direction and the right-left direction mean the vehicle up-down direction and the vehicle width direction, respectively.

As illustrated in FIG. 1, an instrument panel 14 is provided at the front portion of a vehicle cabin 13 of the vehicle 10. The instrument panel 14 extends in the vehicle width direction. A steering wheel 16 is provided on the vehicle right side of the instrument panel 14. That is, the vehicle 10 according to the present embodiment is a so-called right-hand-drive vehicle in which the steering wheel 16 is provided on the right side and a driver's seat is provided on the right side, by way of example. In addition, windshield glass 18 is provided at the front end portion of the instrument panel 14.

The windshield glass 18 extends from the front end portion of the instrument panel 14 toward the vehicle upper side to separate the outside and the inside of the vehicle cabin 13 of the vehicle 10. An end portion of the windshield glass 18 on the vehicle right side is fixed to a front pillar 20 on the vehicle right side. The front pillar 20 extends in the vehicle up-down direction, and the windshield glass 18 is fixed to an end portion of the front pillar 20 on the inner side in the vehicle width direction. The front end portion of front side glass 22 is fixed to an end portion of the front pillar 20 on the outer side in the vehicle width direction. An end portion of the windshield glass 18 on the vehicle left side is fixed to a front pillar on the vehicle left side (not illustrated).

The instrument panel 14 is provided with a first display portion 24 as a display portion that includes an image display region 24A. The first display portion 24 is constituted by a meter display provided on the vehicle right side in the instrument panel 14 and on the vehicle front side of the driver's seat. The first display portion 24 is connected to various meter devices mounted on the vehicle 10, and provided at a position in sight of a driver looking ahead of the vehicle.

The instrument panel 14 is provided with a second display portion 25 as a display portion that includes an image display region 25A. The second display portion 25 is constituted by a center display disposed at the center portion of the instrument panel 14 in the vehicle width direction.

The windshield glass 18 is provided with a third display portion 26 as a display portion that includes an image display region 26A. The third display portion 26 is set on the vehicle upper side of the first display portion 24, and the display region 26A is constituted by a projection surface projected by a head-up display device 40 (see FIG. 2). Specifically, the head-up display device 40 is provided on the vehicle front side of the instrument panel 14, and configured such that an image is projected from the head-up display device 40 to the display region 26A of the third display portion 26 on the windshield glass 18. That is, the third display portion 26 is a part of the windshield glass 18 as a projection surface for the head-up display device 40.

Hardware Configurations of Vehicle 10

Figure 2:
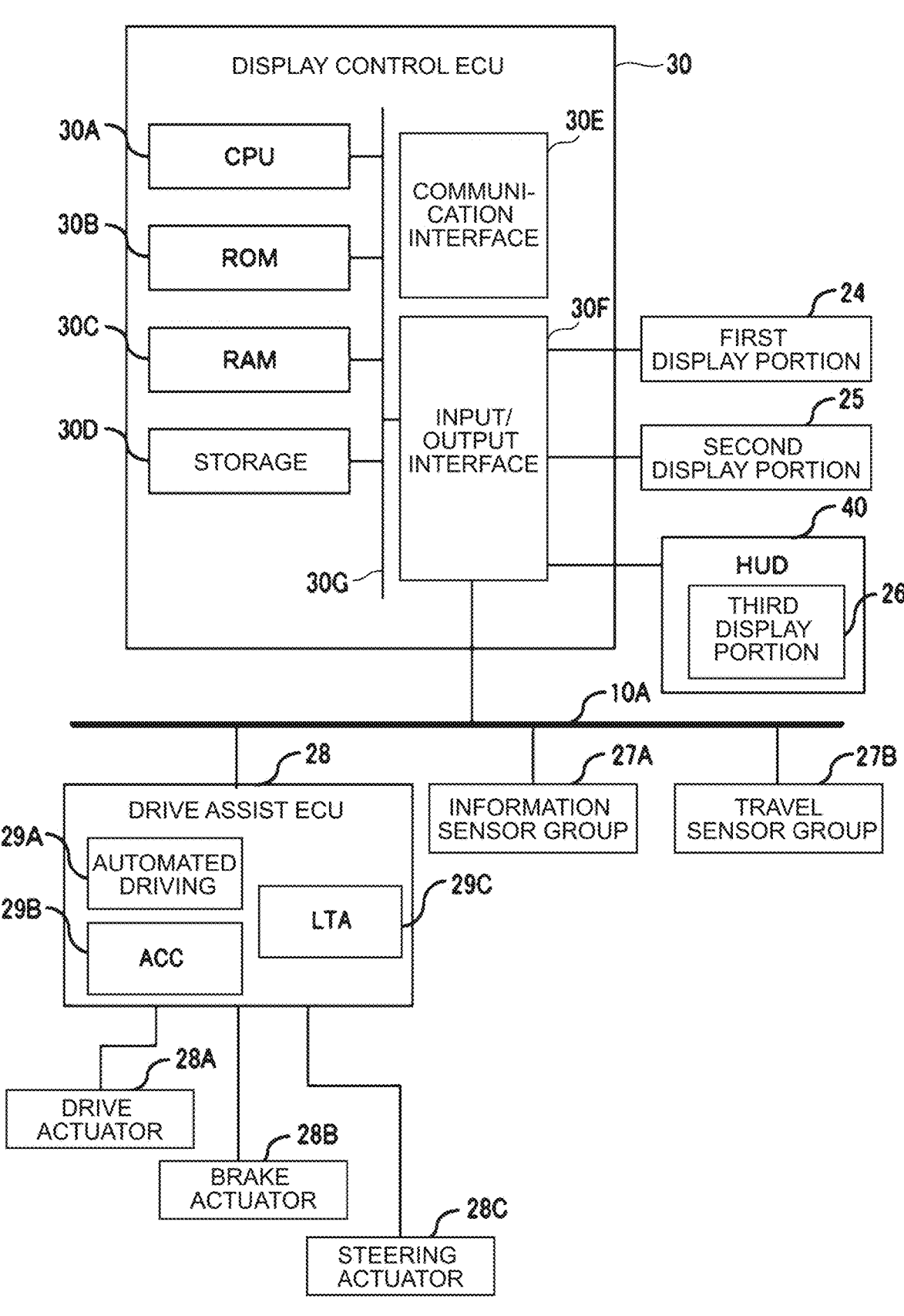
FIG. 2 is a block diagram illustrating the hardware configuration of the vehicle according to the embodiment.

FIG. 2 is a block diagram illustrating the hardware configuration of the vehicle 10.

As illustrated in FIG. 2, the vehicle 10 includes a communication bus 10A in the vehicle cabin 13. An information sensor group 27A, a travel sensor group 27B, a drive assist ECU 28, and a display control ECU 30 are connected to the communication bus 10A. Various other ECUs may be connected to the communication bus 10A in addition to the drive assist ECU 28 and the display control ECU 30.

The information sensor group 27A includes a camera, a radar or light detection and ranging or laser imaging detection and ranging (LIDAR), a global positioning system (GPS) device, an in-vehicle communication device, a navigation device, etc. (not illustrated). The camera captures a scene around the vehicle 10. The camera according to the present embodiment is configured to include at least a front camera that captures a scene ahead of the vehicle 10 and a back camera that captures a scene in rear of the vehicle 10.

However, the number of cameras is not limited thereto, and the camera may further include a right side camera that captures a scene on the right side of the vehicle 10 and a left side camera that captures a scene on the left side of the vehicle 10.

The radar detects the distance to and the direction of an object around the vehicle 10 using radio waves. The LIDAR detects the distance to and the direction of an object around the vehicle 10 using laser light. In the present embodiment, the radar and the LIDAR include a signal processing unit (not illustrated) that has a function of processing the result of detecting an object around the vehicle. The signal processing unit excludes noise, roadside objects such as guard rails, etc. from objects to be monitored, based on changes in relative positions and relative speeds with respect to individual objects included the results of a plurality of most recent detections etc., and follows and monitors specific objects such as surrounding vehicles that are present around the vehicle 10 as surrounding targets.

The GPS device detects the present position of the vehicle 10 by receiving GPS signals from a plurality of GPS satellites. The in-vehicle communication device is a communication device that performs at least one of vehicle-to-vehicle communication with a different vehicle and road-to-vehicle communication with a roadside device. The navigation device includes a map information storage unit that stores map information, and performs a process of displaying the position of the vehicle 10 on a map and providing guidance on a route to a destination based on the position information obtained from the GPS device and the map information stored in the map information storage unit.

The travel sensor group 27B includes a steering angle sensor, a vehicle speed sensor, an acceleration sensor, a yaw rate sensor, an acceleration pedal sensor, a brake pedal sensor, etc. (not illustrated) as a plurality of sensors that acquires the travel state of the vehicle 10. The steering angle sensor is a device that detects the steering angle of the vehicle 10, and is provided on the steering wheel 16 to detect the steering angle of the steering wheel 16, for example. The vehicle speed sensor is a device that detects the travel speed of the vehicle 10, and is provided on a wheel of the vehicle 10, a drive shaft that rotates together with the wheel, etc., to detect the rotational speed of the wheel, for example.

The acceleration sensor is a device that detects the acceleration applied to the vehicle 10, and can be a three-axis acceleration sensor that detects the acceleration applied in the vehicle front-rear direction as an X-axis direction, the vehicle width direction as a Y-axis direction, and the vehicle height direction as a Z-axis direction, for example. The yaw rate sensor is a device that detects the yaw rate (rotational angular speed) about the vertical axis of the center of gravity of the vehicle 10, and can be a gyro sensor, for example.

The accelerator pedal sensor is a device provided on a shaft portion of an accelerator pedal of the vehicle 10 to detect the amount of depression of the accelerator pedal, and outputs an accelerator operation signal that matches the detected amount of depression of the accelerator pedal. The brake pedal sensor is a device provided on a shaft portion of a brake pedal of the vehicle 10 to detect the amount of depression of the brake pedal, and outputs a brake operation signal that matches the detected amount of depression of the brake pedal.

Information etc. detected by the information sensor group 27A and the travel sensor group 27B is output to the various ECUs such as the drive assist ECU 28 and the display control ECU 30 via the communication bus 10A.

Configuration of Drive Assist ECU 28

The drive assist ECU 28 includes a central processing unit (CPU: processor), a memory such as a read only memory (ROM) and a random access memory (RAM), a non-volatile storage such as a hard disk drive (HDD) and a solid state drive (SSD), a communication interface (communication I/F), and an input/output interface (input/output I/F) (not illustrated). The components are connected so as to be communicable with each other via a bus.

The drive assist ECU 28 implements various functions for providing assistance for driving the vehicle 10, including at least drive control and braking control of the vehicle 10, by the CPU executing one or more pieces of software stored in the storage. In the present embodiment, the storage stores automated driving software (hereinafter simply referred to as "automated driving") 29A that implements an automated driving function, auto cruise control (ACC) software (hereinafter simply referred to as "ACC") 29B that implements an ACC function, and lane tracing assist (LTA) software 29C that implements an LTA function, by way of example.

The automated driving 29A is an application that implements a function of autonomously driving the vehicle 10. The ACC 29B is an application that implements a function of performing preceding vehicle following travel in which the vehicle 10 travels while keeping the inter-vehicle distance from a preceding vehicle constant. The LTA 29C is an application that implements a function of recognizing lanes and vehicles around the vehicle 10 and providing assistance on operations of the steering wheel 16 necessary to keep the lane during travel on a road with lanes.

The storage may also store automated parking software that implements a function of automated parking, advanced driver-assistance system (ADAS) software that implements a function of advanced driver-assistance systems, etc. Examples of the ADAS software include an application that implements a function of calculating a corrected trajectory from the vehicle position to a predetermined target trajectory in order to cause the vehicle 10 to travel while following the target trajectory. Additional examples of the ADAS software include an application that implements collision avoidance assist (such as pre-crash safety (PCS)) and a function of an application that implements a function of lane keeping assist (LKA) etc. that causes the vehicle 10 to keep the lane in which the vehicle 10 is traveling. Further examples of the ADAS software include an application that implements a function of collision mitigation braking (such as autonomous emergency braking (AEB)) that autonomously applies braking in order to mitigate a collision, an application that implements a function of lane departure warning (LDW), lane departure alert (LDA), etc. that give a caution for departing from the lane in which the vehicle is traveling.

Various actuators that are used to control the vehicle 10, such as a drive actuator 28A, a brake actuator 28B, and a steering actuator 28C, are connected to the drive assist ECU 28.

The drive actuator 28A controls a drive force of the vehicle 10 by controlling the amount of air to be supplied to an engine (throttle opening degree) in accordance with a control signal from the drive assist ECU 28. When the vehicle 10 is a hybrid electric vehicle, a control signal from the drive assist ECU 28 is input to a motor as a power source to control the drive force, in addition to the amount of air to be supplied to the engine. When the vehicle 10 is a battery electric vehicle, a control signal from the drive assist ECU 28 is input to the motor as a power source to control the drive force. In these cases, the motor as a power source constitutes the various actuators discussed above.

The brake actuator 28B controls a braking force to be applied to the wheels of the vehicle 10 by controlling a brake system in accordance with a control signal from the drive assist ECU 28. The brake system may be a hydraulic brake system, for example.

The steering actuator 28C controls drive of an assist motor that controls steering torque, in an electric power steering system, in accordance with a control signal from the drive assist ECU 28. Consequently, the steering actuator 28C controls steering torque of the vehicle 10.

The drive assist ECU 28 performs an automated driving process in which the vehicle 10 is autonomously driven without an occupant of the vehicle 10 performing a driving operation when an automated driving mode is selected, by the CPU of the drive assist ECU 28 executing the automated driving 29A. In the automated driving process, the status of the vehicle 10 and the surroundings is determined based on information obtained from the information sensor group 27A and the travel sensor group 27B to control the drive actuator 28A, the brake actuator 28B, and the steering actuator 28C.

In the present embodiment, the drive assist ECU 28 performs an automated driving process in which the vehicle 10 is autonomously driven without the occupant of vehicle 10 performing a driving operation by the CPU of the drive assist ECU 28 executing the automated driving 29A when an automated driving mode is selected. In the automated driving process, the status of the vehicle 10 and the surroundings is determined based on information obtained from the information sensor group 27A and the travel sensor group 27B to control the drive actuator 28A, the brake actuator 28B, and the steering actuator 28C. The automated driving mode can be switched between an activated state and a deactivated state by operating a switch (not illustrated) provided at a position operable by the occupant seated in the driver's seat. In the present embodiment, when the automated driving mode is set to the activated state, the CPU recognizes that the automated driving function is brought into the activated state, and outputs a signal that indicates the activated state to the display control ECU 30 via the communication bus 10A. Techniques for the automated driving process can be used.

In the present embodiment, the drive assist ECU 28 performs an ACC process for performing preceding vehicle following travel in which the vehicle 10 travels while keeping the inter-vehicle distance from a preceding vehicle traveling ahead constant by the CPU of the drive assist ECU 28 executing the ACC 29B when an ACC mode is selected. In the ACC process, the inter-vehicle distance between the vehicle 10 and the preceding vehicle is determined based on information obtained from the information sensor group 27A and the travel sensor group 27B, and the drive actuator 28A, the brake actuator 28B, and the steering actuator 28C are controlled. As with the automated driving mode, the ACC mode can be switched between an activated state and a deactivated state by operating a switch (not illustrated) provided at a position operable by the occupant seated in the driver's seat. In the present embodiment, when the ACC mode is set to the activated state, the CPU recognizes that the ACC function is brought into the activated state, and outputs a signal that indicates the activated state to the display control ECU 30 via the communication bus 10A. Techniques for the ACC process can be used.

In the present embodiment, the drive assist ECU 28 performs an LTA process for recognizing lanes and vehicles around the vehicle 10 and assisting the driver in performing steering operations, that is, lane keeping operations, by applying steering torque necessary to keep the lane during travel on a road with lanes, by the CPU of the drive assist ECU 28 executing the LTA 29C when an LTA mode is selected.

Configuration of Display Control ECU 30

As illustrated in FIG. 2, the display control ECU 30 is configured to include a CPU 30A, a ROM 30B, a RAM 30C, a storage 30D, a communication interface 30E, and an input/output interface 30F. The components are connected so as to be communicable with each other via a bus 30G.

The CPU 30A is a central processing unit, and executes various programs and controls various portions. That is, the CPU 30A reads a program from the ROM 30B or the storage 30D, and executes the program using the RAM 30C as a work area. The CPU 30A controls the various components and performs various computation processes in accordance with the program stored in the ROM 30B or the storage 30D.

The ROM 30B stores various programs and various data. The RAM 30C temporarily stores a program or data as a work area. The storage 30D is constituted by a hard disk drive (HDD) or a solid state drive (SSD), and stores various programs and various data including an operating system. In the present embodiment, the ROM 30B or the storage 30D stores a vehicle display control program for performing a vehicle display control process, various data, etc.

The communication interface 30E is an interface for the display control ECU 30 to communicate with a server and other devices (not illustrated), and may use a standard such as Ethernet (registered trademark), long-term evolution (LTE), fiber distributed data interface (FDDI), Wi-Fi (registered trademark), etc., for example.

The first display portion 24, the second display portion 25, the head-up display device (HUD) 40, and the communication bus 10A are connected to the input/output interface 30F. In the present embodiment, an image is projected onto the third display portion 26 by the head-up display device 40.

Functional Configuration of Display Control ECU 30

The display control ECU 30 implements various functions using the above hardware resources. Functional components implemented by the display control ECU 30 will be described with reference to FIG. 3.

Figure 3:
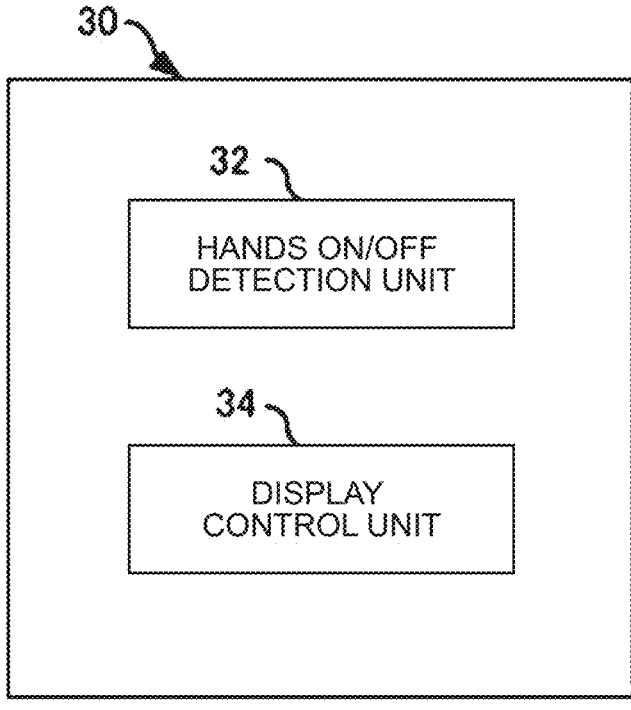
FIG. 3 is a block diagram illustrating the functional configuration of a display control ECU according to the embodiment.

As illustrated in FIG. 3, the display control ECU 30 is configured to include a hands on/off detection unit 32 and a display control unit 34 as functional components. The functional components are implemented by the CPU 30A reading and executing the vehicle display control program stored in the ROM 30B or the storage 30D.

The hands on/off detection unit 32 detects which of a hands on mode in which the steering wheel 16 needs to be grasped and an hands off mode in which the steering wheel 16 does not need to be grasped is activated. Specifically, the hands on/off detection unit 32 detects the activated state of the applications of the drive assist ECU 28. For example, the hands on/off detection unit 32 detects a signal output from the drive assist ECU 28 via the communication bus 10A and indicating that the automated driving function is in the activated state when the automated driving mode is in the activated state. Similarly, the hands on/off detection unit 32 detects a signal output from the drive assist ECU 28 via the communication bus 10A and indicating that the ACC function is in the activated state. Similarly, the hands on/off detection unit 32 detects a signal output from the drive assist ECU 28 via the communication bus 10A and indicating that the LTA function is in the activated state.

Figure 4:
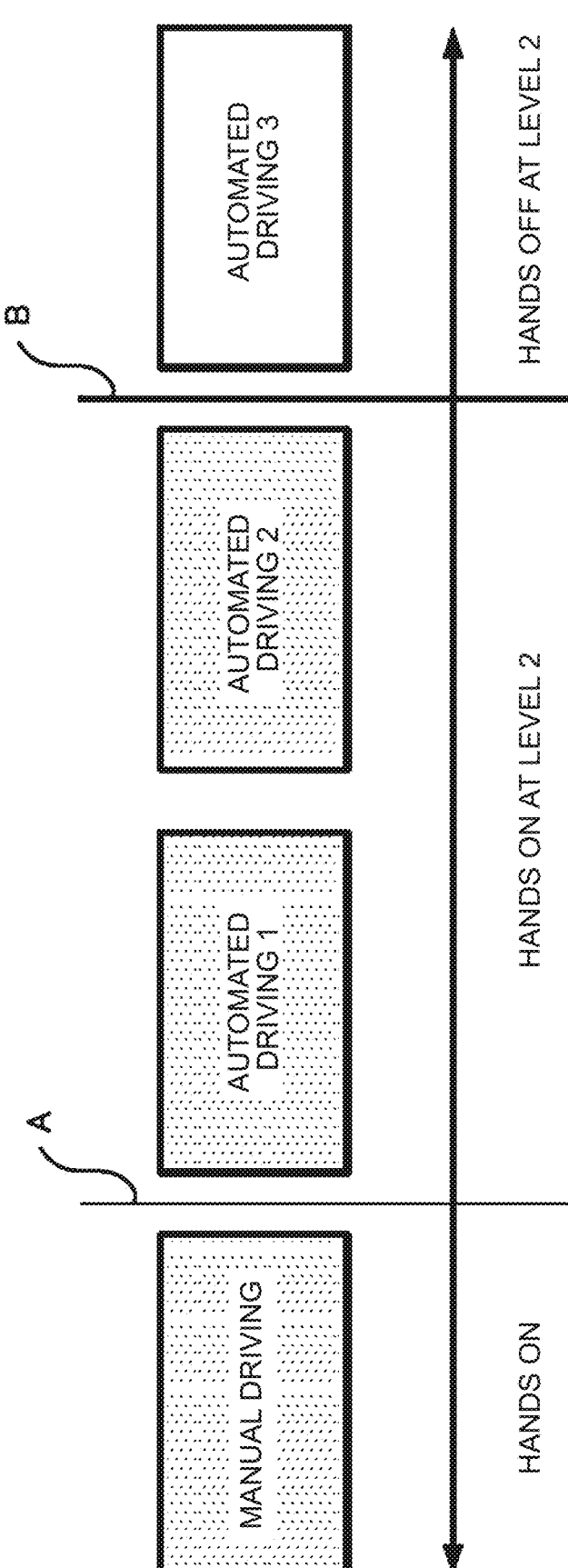
FIG. 4 illustrates a hands on mode and a hands off mode.

FIG. 4 illustrates the hands on mode and the hands off mode. In the present embodiment, as illustrated in FIG. 4, the hands on mode is used on the left side of a line indicated by A in FIG. 4, that is, in a manual driving mode, by way of example. Meanwhile, the hands on mode and the hands off mode are used on the right side of the line indicated by A, that is, in the automated driving mode. In the present embodiment, the automated driving corresponds to level 2, by way of example.

In the automated driving mode, the hands on mode and the hands off mode are used in a mixed manner. In the present embodiment, the hands on mode is used for automated driving 1 and automated driving 2 on the left side of a line indicated by B in FIG. 4, by way of example. On the other hand, the hands off mode is used for automated driving 3 on the right side of the line indicated by B in FIG. 4. In the automated driving 1, the ACC mode and the LTA mode are activated, by way of example. In the automated driving 2, meanwhile, other additional applications are started for further advancement compared to the automated driving 1. In the automated driving 3, other additional applications are started for further advancement compared to the automated driving 2 to enable hands off driving.

The hands on/off detection unit 32 discriminates between the hands on mode and the hands off mode by detecting the activated state of the applications of the drive assist ECU 28 and determining which driving indicated in FIG. 4 the present driving state corresponds to.

The display control unit 34 controls display in the display region 24A of the first display portion 24 based on the presently activated mode detected by the hands on/off detection unit 32. Specifically, the entire main image is provided with a display taste that is common to the hands on mode and the hands off mode, and the display mode of an auxiliary image is changed between the hands on mode and the hands off mode. In the present embodiment, the hands on mode is used when modes for manual driving, automated driving 1, and automated driving 2 on the left side of the line indicated by B in FIG. 4 are selected, by way of example. Therefore, the display control unit 34 displays "display 1" on the first display portion 24 in the modes for manual driving, automated driving 1, and automated driving 2.

Figure 5:
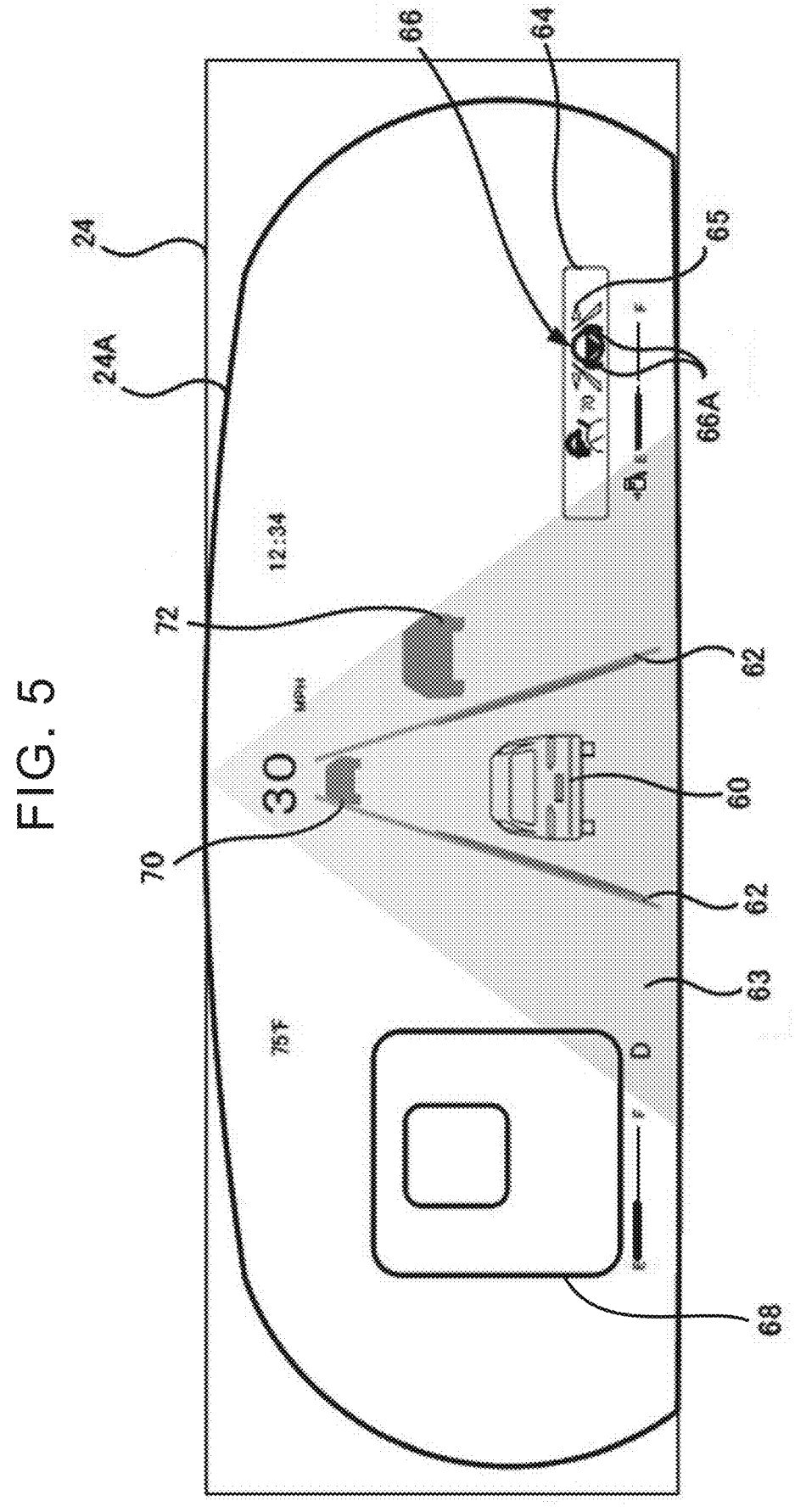
FIG. 5 illustrates an example of display 1 in a display region of a first display portion in the hands on mode according to the embodiment.

FIG. 5 illustrates an example of "display 1" in the display region 24A of the first display portion 24 in the hands on mode. As illustrated in FIG. 5, the display control unit 34 displays a vehicle image 60, as a stereoscopic image that indicates the vehicle 10, in the display region 24A of the first display portion 24 generally at the center portion in the right-left direction and on the lower side of the center portion in the up-down direction. The display control unit 34 also displays lane images 62 that indicate lanes on both the right and left sides of the vehicle image 60. In the present embodiment, by way of example, the display control unit 34 displays proximate lane images 62 on both the right and left sides of the vehicle image 60 in a thicker color than that of the other lane images 62, for example. The proximate lane images 62 on both the right and left sides of the vehicle image 60 may be emphasized using a different method as long as the proximate lane images 62 can be highlighted.

The display control unit 34 also displays a state image 64 that indicates the state of the drive assist functions on the lower side in the right side portion. The state image 64 includes an image that indicates the state of the ACC function, a steering image 66 indicating that the vehicle is in the hands on mode in which the steering wheel 16 needs to be grasped, an image that indicates the state of the automated driving mode, an image 65 that indicates the state of the LTA function, etc. In the present embodiment, it is indicated that the hands on mode is used when hand images 66A that each represent a hand are displayed in the steering image 66, by way of example. Conversely, it is indicated that the hands off mode is used when the hand images 66A are not displayed in the steering image 66 (see FIG. 6).

In the state image 64, the display control unit 34 displays an image that indicates a function in the activated state in a more emphasized manner than an image that indicates a function in the deactivated state. The method for emphasized display may be display in an emphasized color, by way of example, but may be display emphasized in a different manner. The display control unit 34 also displays a driver image 68 that indicates driver information etc., for example, generally at the center portion of the left side portion in the up-down direction.

When there is a preceding vehicle traveling ahead of the vehicle 10 in the same lane, the display control unit 34 displays a preceding vehicle image 70 that indicates the preceding vehicle as a stereoscopic image, by way of example, as illustrated in FIG. 5. In the present embodiment, the preceding vehicle image 70 is illustrated as a stereo-scopic shape that represents the outer shape of the preceding vehicle, by way of example. When there is a following vehicle in rear of the vehicle 10 as a surrounding vehicle, for example, the display control unit 34 can display a rear vehicle image in a stereoscopic shape that represents the outer shape of the following vehicle in rear of the vehicle image 60 in the same manner.

When there is an oncoming vehicle traveling in an oncoming lane for the vehicle 10, the display control unit 34 displays an oncoming vehicle image 72 that indicates the oncoming vehicle as a stereoscopic image that represents the outer shape of the oncoming vehicle. In the present embodi-ment, the display control unit 34 selects a stereoscopic image of the relevant surrounding vehicle from among stereoscopic image data stored in advance in the storage 30D and classified in accordance with the vehicle size, vehicle type, vehicle name, etc., for example, and displays the selected stereoscopic image, by way of example.

The display control unit 34 displays a host vehicle periph-eral region 63 that is a region around the vehicle image 60 including the lane images 62 in a highlighted manner in a different color from the other regions. The host vehicle peripheral region 63 is colored in gradations that become thinner farther away from the vehicle 10. "Display 1" is displayed in the mode illustrated in FIG. 5 described above.

In the present embodiment, the hands off mode is used when a mode for automated driving 3 on the right side of the line indicated by B in FIG. 4 is selected, by way of example. Therefore, the display control unit 34 displays "display 2" on the first display portion 24 in the mode for automated driving 3.

Figure 6:
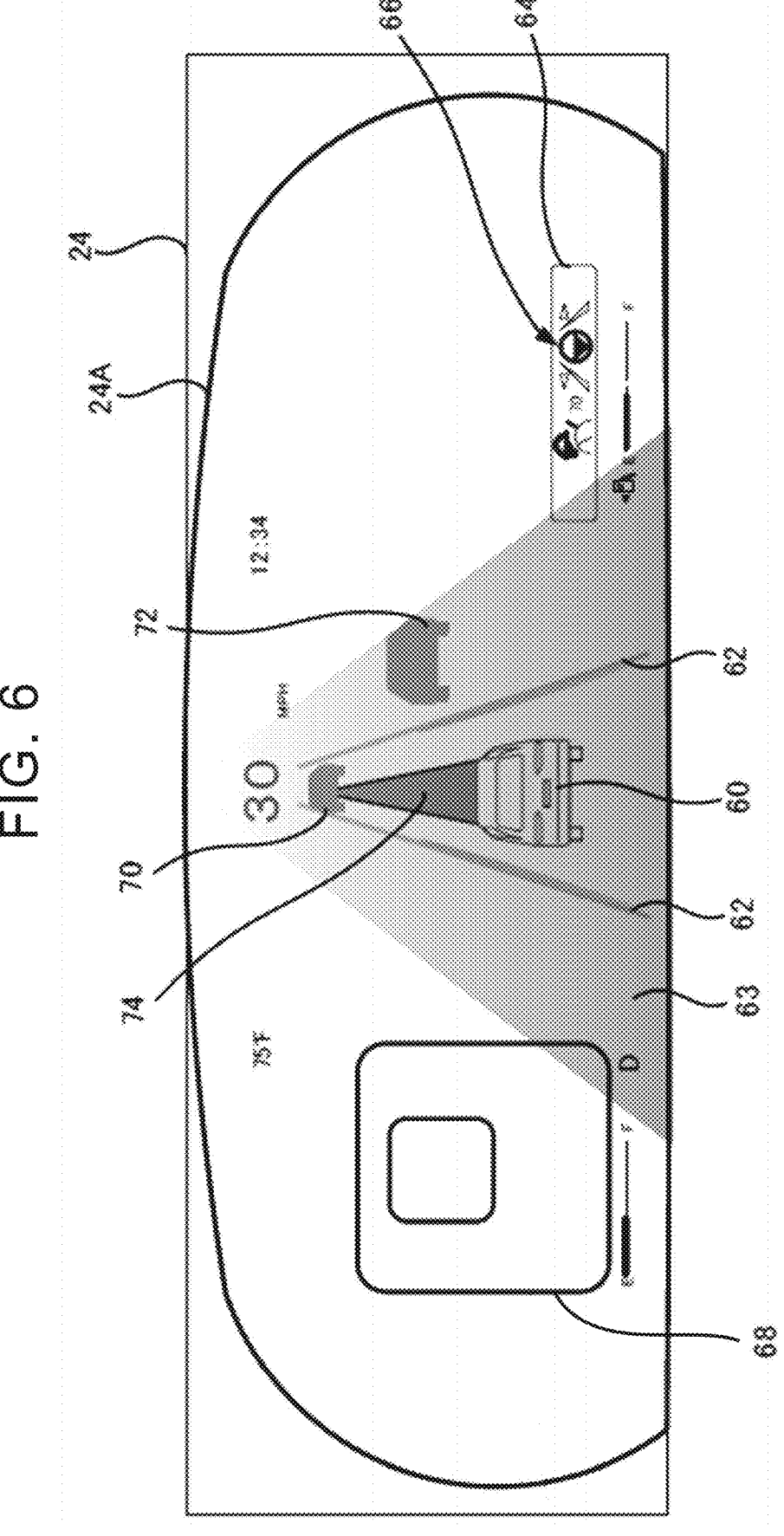
FIG. 6 illustrates an example of display 2 in the display region of the first display portion in the hands off mode according to the embodiment.
Figure 7:
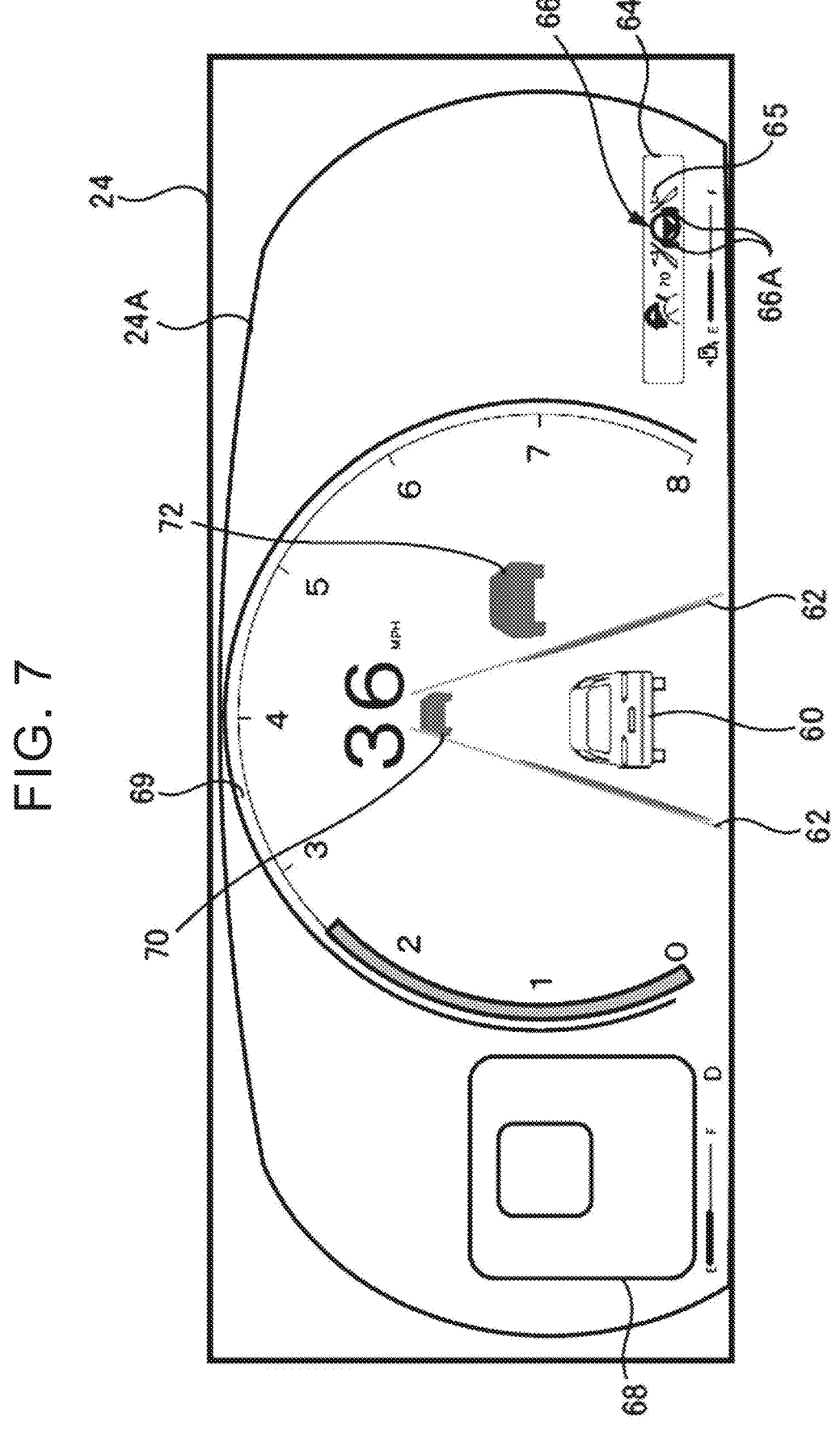
FIG. 7 illustrates an example of a display taste different from display 1 in the display region of the first display portion in the hands on mode according to the embodiment.

FIG. 6 illustrates an example of "display 2" in the display region 24A of the first display portion 24 in the hands off mode. In the display of "display 2" illustrated in FIG. 6, the entire main image is provided with a common display taste and the display mode of an auxiliary image is changed, compared to the display of "display 1" illustrated in FIG. 5. In the present embodiment, an image that includes the vehicle image 60, the lane images 62, the preceding vehicle image 70, and the oncoming vehicle image 72 is defined as a main image 80, by way of example. FIG. 7 illustrates an example of a display taste different from "display 1" in the display region 24A of the first display portion 24 in the hands on mode. In the embodiment, the "display taste" is used to intend the direction of display design including the atmosphere corresponding to the purpose such as sports mode, eco mode, and drive mode, for example.

While the main image 80 is displayed at the entire center portion of the display region 24A in FIGS. 5 and 6, a tachometer image 69 that indicates the engine rotational speed is displayed at the entire center portion of the display region 24A in FIG. 7 illustrated as an example of a different display taste. The main image 80 is displayed inside the tachometer image 69. That is, the main image 80 is dis-played in a different size and at a different position in the display region 24A. In this manner, there is a difference between FIGS. 5 and 7 in the direction of display design, that is, the display taste, including the atmosphere of the display region 24A as a whole.

In the present embodiment, as discussed above, the entire main image 80 in the display of "display 2" illustrated in FIG. 6 is provided with a display taste that is common to the display of "display 1" illustrated in FIG. 5. As illustrated in FIG. 6, the display control unit 34 changes the display mode of an auxiliary image 90, including the host vehicle periph-eral region 63 and a trajectory line image 74 that is the trajectory line of the preceding vehicle indicated by the preceding vehicle image 70, from "display 1" illustrated in FIG. 5. In the present embodiment, "changing the display mode" includes changing from a hidden state to a displayed state.

Specifically, the display control unit 34 displays the host vehicle peripheral region 63 in an emphasized manner in "display 2" in FIG. 6 by displaying the host vehicle periph-eral region 63 in a thicker color than that in "display 1" in FIG. 5. In "display 2" in FIG. 6, in addition, the display control unit 34 displays the trajectory line image 74 that is hidden in "display 1" in FIG. 5. The trajectory line image 74 is formed as a band-shaped line that extends from the preceding vehicle image 70 to the vehicle image 60, and displayed such that the outer edge portions are emphasized compared to the inner side in the width direction.

Functions

Next, functions and effects of the present embodiment will be described.

Display Control Process

An example of a display control process of displaying an image in the display region 24A of the first display portion 24 will be described with reference to the flowchart illus-trated in FIG. 8. The display control process is executed by the CPU 30A reading the display control program from the ROM 30B or the storage 30D, developing the display control program in the RAM 30C, and executing the display control program.

As illustrated in FIG. 8, in step S11, the CPU 30A starts display in the mode of "display 1" in the display region 24A of the first display portion 24 through the function of the display control unit 34. Next, in step S12, the CPU 30A determines whether the automated driving mode is detected. Specifically, the CPU 30A determines whether the auto-mated driving mode is detected based on a signal output from the drive assist ECU 28 and indicating that the auto-mated driving function is in the activated state.

When the automated driving mode is not detected, a negative determination is made in step S12, and the CPU 30A proceeds to the process in step S11 and continues display in the mode of "display 1". When the automated driving mode is detected, on the other hand, a positive determination is made in step S12, and the CPU 30A proceeds to the process in step S13.

In step S13, the CPU 30A detects whether one of the hands on mode and the hands off mode is used. Specifically, the CPU 30A detects whether one of the hands on mode and the hands off mode is used as discussed above based on the activated state of the applications output from the drive assist ECU 28 through the function of the hands on/off detection unit 32.

In step S14, the CPU 30A determines whether the hands on mode is used. Specifically, the CPU 30A determines whether the hands on mode is used based on the mode detected through the function of the hands on/off detection unit 32. When the hands on mode is used, the CPU 30A makes a positive determination in step S14, and proceeds to the process in step S15. In step S15, the CPU 30A continues display in the mode of "display 1" illustrated in FIG. 5 as discussed above through the function of the display control unit 34.

When the hands on mode is not used, that is, when the hands off mode is used, on the other hand, the CPU 30A makes a negative determination in step S14, and proceeds to the process in step S16. In step S16, the CPU 30A changes to display in the mode of "display 2" illustrated in FIG. 6 by changing the display mode of the auxiliary image 90 while maintaining the display taste of "display 1" as discussed above through the function of the display control unit 34.

Next, when the process in step S15 or S16 is performed, the CPU 30A determines whether an instruction to finish display is provided in step S17. Specifically, the CPU 30A determines that an instruction to finish display is provided when power for the vehicle 10 is stopped etc., by way of example.

When an instruction to finish display is provided, the CPU 30A makes a positive determination in step S17, and ends the display control process. When an instruction to finish display is not provided, on the other hand, the CPU 30A makes a negative determination in step S17, and the CPU 30A proceeds to the process in step S12.

With the display control ECU 30 as the vehicle display control device according to the present embodiment, as described above, the display control unit 34 displays the main image 80 and the auxiliary image 90 in the display region 24A of the first display portion 24 mounted on the vehicle 10 by providing the entire main image 80 with a display taste that is common to the hands on mode and the hands off mode while changing the display mode of the auxiliary image 90 between the hands on mode and the hands off mode. Consequently, it is possible to suppress the amount of change on the display screen in the entire main image 80, since the entire main image 80 is provided with a display taste that is common to the hands on mode and the hands off mode. Therefore, it is possible to suppress an occupant feeling annoyed when mode switching is made between the hands on mode and the hands off mode. In addition, it is possible to keep the connection in the display taste between the hands on mode and the hands off mode, since the entire main image 80 is provided with a display taste that is common to the hands on mode and the hands off mode. In addition, the occupant is allowed to recognize the hands on mode and the hands off mode, since the display mode of the auxiliary image 90 is changed between the hands on mode and the hands off mode.

In the present embodiment, the display control unit 34 displays the main image 80 and the auxiliary image 90 in the display region 24A of the first display portion 24 mounted on the vehicle 10 in the hands on mode by providing the entire main image 80 with a display taste that is common to the manual driving mode and the automated driving mode while changing the display mode of the auxiliary image 90 between the manual driving mode and the automated driving mode. Consequently, it is possible to suppress the amount of change on the display screen in the entire main image 80 in the hands on mode, since the entire main image 80 is provided with a display taste that is common to the manual driving mode and the automated driving mode. Therefore, it is possible to suppress the occupant feeling annoyed when mode switching is made between the manual driving mode and the automated driving mode. In addition, it is possible to keep the connection in the display taste between the manual driving mode and the automated driving mode, since the entire main image 80 is provided with a display taste that is common to the manual driving mode and the automated driving mode.

In the present embodiment, the hands on mode includes the driving assist mode indicated by the automated driving 1 in FIG. 4 and the automated driving mode indicated by the automated driving 2 in FIG. 4, and thus it is possible to suppress the amount of change in the display mode of the entire main image 80 and the auxiliary image 90 between the driving assist mode and the automated driving mode. Therefore, it is possible to suppress the occupant feeling annoyed when mode switching is made between the driving assist mode and the automated driving mode in the hands on mode.

The driving assist mode includes the ACC and the LTA, and thus it is possible to suppress the amount of change in the display mode of the entire main image 80 and the auxiliary image 90 between the ACC and the LTA and the automated driving mode. Therefore, it is possible to suppress the occupant feeling annoyed when mode switching is made between the ACC and the LTA and the automated driving mode.

In the present embodiment, the main image 80 is an image that includes the vehicle image 60 as an image of the host vehicle, the preceding vehicle image 70 and the oncoming vehicle image 72 as an image of a different vehicle, and the lane images 62, and therefore the display taste is not changed for the vehicle image 60, the lane images 62, the preceding vehicle image 70, and the oncoming vehicle image 72. Therefore, the occupant can visually recognize the positional relationship of the vehicle image 60, the lane images 62, the preceding vehicle image 70, and the oncoming vehicle image 72 without feeling annoyed by a change in the display taste.

In the present embodiment, in addition, the display control unit 34 displays the host vehicle peripheral region 63 as the auxiliary image 90 in the display region 24A of the first display portion 24 with the tint of the host vehicle peripheral region 63 changed, and thus the occupant can recognize mode switching between the hands on mode and the hands off mode in accordance with the change in the tint of the host vehicle peripheral region 63 without changing the tint of the main image 80.

In the present embodiment, the occupant can recognize mode switching between the hands on mode and the hands off mode when the display mode of the trajectory line image 74 as the auxiliary image 90 is changed.

Supplementary Description

In the embodiment, the display control unit 34 displays the host vehicle peripheral region 63 in an emphasized manner by displaying the host vehicle peripheral region 63 in a color thicker than that in "display 1" in FIG. 5 as the method of changing the display mode of the host vehicle peripheral region 63. However, the present disclosure is not limited thereto. For example, the host vehicle peripheral region 63 may be hidden in "display 2" in FIG. 6, or may be displayed in a color thinner than that in "display 1" in FIG. 5, as the method of changing the display mode. Alternatively, the host vehicle peripheral region 63 may be displayed in a different color from that in "display 1" in FIG. 5, or a different emphasizing method may be used.

In the embodiment, the display control unit 34 hides the trajectory line image 74 in "display 1" in FIG. 5, and displays the trajectory line image 74 in "display 2" in FIG. 6, as the method of changing the display mode of the trajectory line image 74. However, the present disclosure is not limited thereto. For example, the trajectory line image 74 may be displayed in "display 1" in FIG. 5, and the trajectory line image 74 may be displayed in "display 2" in FIG. 6 in a thinner or thicker color than that in "display 1" in FIG. 5 or in a different color from that in "display 1" in FIG. 5, as the method of changing the display mode. Alternatively, a different emphasizing method may be used.

While the display control unit 34 changes the display mode of both the host vehicle peripheral region 63 and the trajectory line image 74 as the auxiliary image 90 in the embodiment, the present disclosure is not limited thereto. The display control unit 34 may change the display mode of only the host vehicle peripheral region 63 as the auxiliary image 90, or may change the display mode of only the trajectory line image 74 as the auxiliary image 90. Another image may be added as the auxiliary image 90.

While the hands on mode includes the manual driving mode and the automated driving mode in the embodiment, the present disclosure is not limited thereto. For example, the display control unit 34 may display the main image 80 and the auxiliary image 90 by providing the entire main image 80 with a display taste that is common to the hands on mode and the hands off mode while changing the display mode of the auxiliary image 90 between the hands on mode and the hands off mode only in the automated driving mode. In this case, the display control unit 34 may display the main image 80 and the auxiliary image 90 in the display region 24A of the first display portion 24 by using the display taste used in FIG. 7, that is, a different display taste from that used in the automated driving mode, by way of example.

While the ACC mode and the LTA mode are activated in the automated driving 1 in FIG. 4 in the embodiment, the present disclosure is not limited thereto. For example, other drive assist functions may be activated. While the hands on mode at level 2 positioned between the line indicated by A and the line indicated by B includes the automated driving 1 and the automated driving 2 as illustrated in FIG. 4 in the present embodiment, the present disclosure is not limited thereto. For example, the hands on mode at level 2 may include only the automated driving 2, or may include only the automated driving 1. That is, it is only necessary that the hands on mode at level 2 should include driving in the hands on mode.

While the display region 24A of the first display portion 24 displays a display region that illustrates a forward view from the vehicle 10 in the embodiment discussed above, the present disclosure is not limited thereto. For example, the display region 25A of the second display portion 25 as a display provided in the instrument panel 14 may display a display region that illustrates a forward view from the vehicle 10 as in a modification illustrated in FIG. 9.

Figure 9:
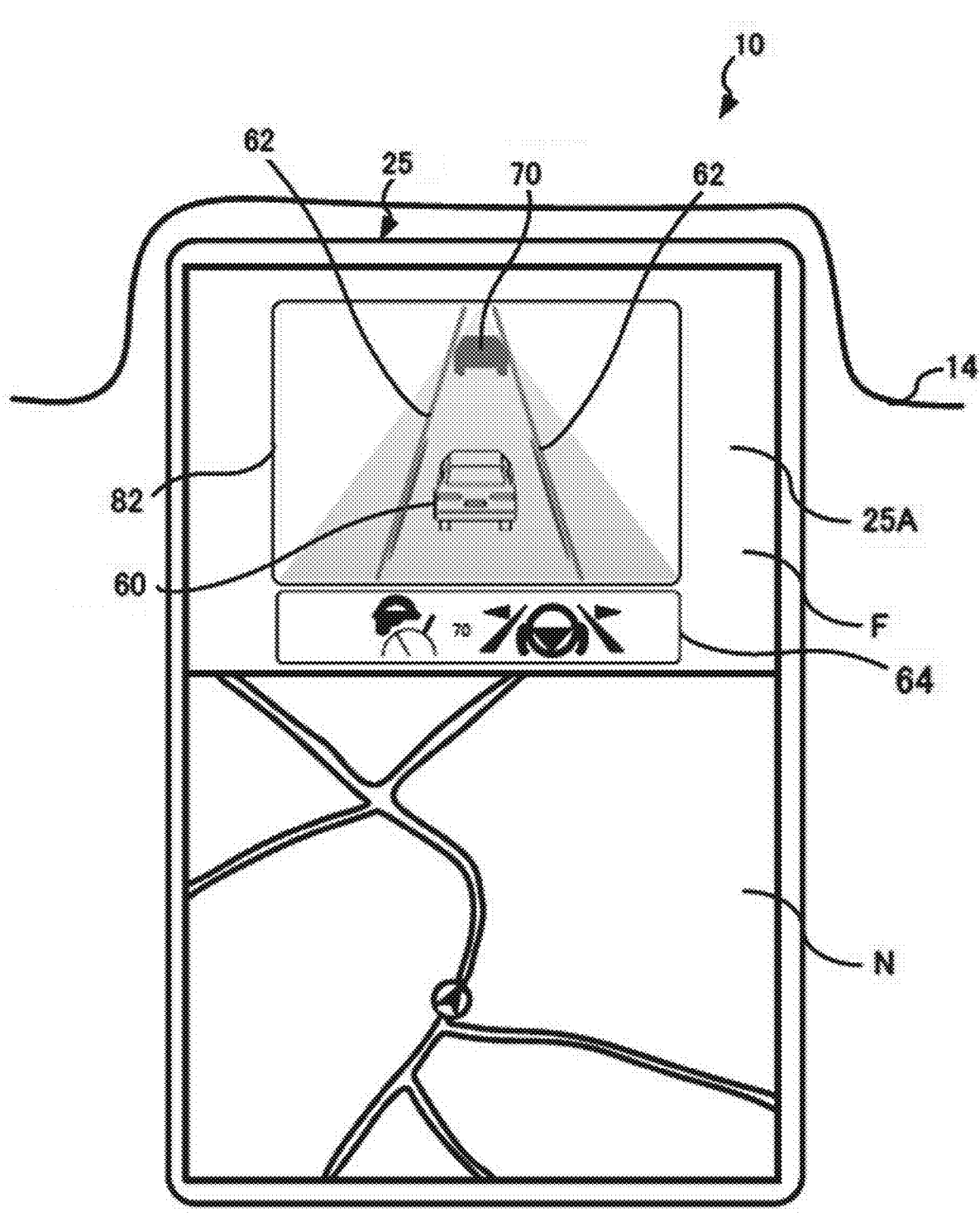
FIG. 9 illustrates an example of display in a display region of a third display portion.

In the present modification, as illustrated in FIG. 9, the display region 25A of the second display portion 25 is divided vertically. In the second display portion 25 illustrated in FIG. 9, a map image N that indicates the present position of the vehicle 10 is displayed at the lower portion of the display region, and a peripheral image 82 and the state image 64 are displayed at the upper portion of the display region.

In this manner, in the present modification, the peripheral image 82 and the state image 64 are displayed in the second display portion 25 provided in the instrument panel 14. This allows the occupant that visually recognizes the second display portion 25 to easily recognize the activated state of the drive assist functions, as in the embodiment discussed above, irrespective of the seated position.

Similarly, the peripheral image 82 and the state image 64 may be displayed in the display region 26A of the third display portion 26 constituted by the projection surface of the head-up display device 40. The display region 26A is a projection surface projected by the head-up display device 40 on the vehicle forward side of the driver's seat, and thus the peripheral image 82 and the state image 64 are displayed as superposed on the forward view from the driver's seat. This allows the occupant in the driver's seat to recognize the activated state of the drive assist functions without significantly moving the line of sight.

Various processors other than the CPU may execute the processes executed by the CPU 30 illustrated in FIG. 2 by reading the software (program) in the present embodiment. The processors in this case include a dedicated electric circuit that is a processor including a circuit configuration exclusively designed for executing a specific process, such as a programmable logic device (PLD) having a circuit configuration that can be changed after the manufacture such as a field-programmable gate array (FPGA), and an application specific integrated circuit (ASIC). The processes may be performed by one of the various processors, or may be performed by a combination of two or more processors of the same type or different types (e.g. a plurality of FPGAs or a combination of a CPU and an FPGA). The hardware configuration of the various processors is, more specifically, an electric circuit in which circuit elements such as semiconductor elements are combined.

The programs described in relation to the present embodiment may be provided in the form of being stored in a storage medium such as a Compact Disc Read Only Memory (CD-ROM), a Digital Versatile Disc Read Only Memory (DVD-ROM), and a Universal Serial Bus (USB) memory. Alternatively, the programs may be downloaded from an external device via a network.

While the embodiment of the present disclosure has been described above, the present disclosure is not limited to the above embodiment, and it should be understood that the present disclosure can be modified in various ways without departing from the spirit and scope of the present disclosure.

What is claimed is:

1. A vehicle comprising:
a display; and
an electronic control unit configured to:
   cause the vehicle to perform an autonomous driving, the autonomous driving being performed in a hands on mode or a hands off mode, the hands on mode requiring a driver to grasp a steering wheel of the vehicle, and the hands off mode not requiring the driver to grasp the steering wheel,
   display a main image on the display during the autonomous driving, the main image including a first icon representing the vehicle,
   display a first auxiliary image on the display adjacent to the main image while keeping the main image on the display in a case where the autonomous driving is in the hands on mode, and
   display a second auxiliary image on the display adjacent to the main image while keeping the main image on the display in a case where the autonomous driving is in the hands off mode, wherein the first auxiliary image is not displayed on the display in a case where the autonomous driving is in the hands off mode, the second auxiliary image is not displayed on the display in a case where the autonomous driving is in the hands on mode, and the second auxiliary image represents a trajectory line of a preceding vehicle traveling in front of the vehicle.

2. The vehicle according to claim 1, wherein the hands on mode includes a driving assist mode and an automated driving mode.

3. The vehicle according to claim 2, wherein the driving assist mode includes auto cruise control and lane tracing assist.

4. The vehicle according to claim 1, wherein the main image includes a second icon representing a different vehicle from the vehicle and a lane image.

5. The vehicle according to claim 1, wherein the first auxiliary image represents a peripheral region of the first icon.

6. A vehicle comprising:

a display; and an electronic control unit configured to:

cause the vehicle to perform an autonomous driving, the autonomous driving being performed in a hands on mode or a hands off mode, the hands on mode requiring a driver to grasp a steering wheel of the vehicle, and the hands off mode not requiring the driver to grasp the steering wheel, display a main image on the display during the autonomous driving, the main image including a first icon representing the vehicle, display a first auxiliary image on the display adjacent to the main image during the autonomous driving while keeping the main image on the display, and display a second auxiliary image on the display adjacent to the main image while keeping the main image on the display in a case where the autonomous driving is in the hands on mode, wherein the electronic control unit is further configured to change a tint in a region of the first auxiliary image in the hands on mode and the hands off mode, and the second auxiliary image is not displayed on the display in a case where the autonomous driving is in the hands off mode.

7. A vehicle comprising:

a display; and an electronic control unit configured to:

cause the vehicle to perform an autonomous driving, the autonomous driving being performed in a bands on mode or a hands off mode, the hands on mode requiring a driver to grasp a steering wheel of the vehicle, and the hands off mode not requiring the driver to grasp the steering wheel, display a main image on the display during the autonomous driving, the main image including a first icon representing the vehicle, display a first auxiliary image on the display adjacent to the main image while keeping the main image on the display in a case where the autonomous driving is in the hands on mode, and display a second auxiliary image on the display adjacent to the main image while keeping the main image on the display in a case where the autonomous driving is in the hands off mode, wherein the first auxiliary image is not displayed on the display in a case where the autonomous driving is in the hands off mode, and the second auxiliary image is not displayed on the display in a case where the autonomous driving is in the hands on mode, a width of the first auxiliary image is wider than a width of the first icon, and a width of the second auxiliary image is narrower than the width of the first icon.

8. The vehicle according to claim 6, wherein a width of the first auxiliary image is wider than a width of the first icon, and a width of the second auxiliary image is narrower than the width of the first icon.

9. The vehicle according to claim 1, wherein the second auxiliary image is a band-shaped line that extends from the first icon.

10. The vehicle according to claim 6, wherein the second auxiliary image is a band-shaped line that extends from the first icon.

11. The vehicle according to claim 1, wherein the display is a meter display.

12. The vehicle according to claim 6, wherein the display is a meter display.

13. The vehicle according to claim 1, wherein a location in which the first auxiliary image is displayed and a location in which the second auxiliary image is displayed at least partially overlap.

14. The vehicle according to claim 6, wherein a location in which the first auxiliary image is displayed and a location in which the second auxiliary image is displayed at least partially overlap.

* * * * *